Figure 1:
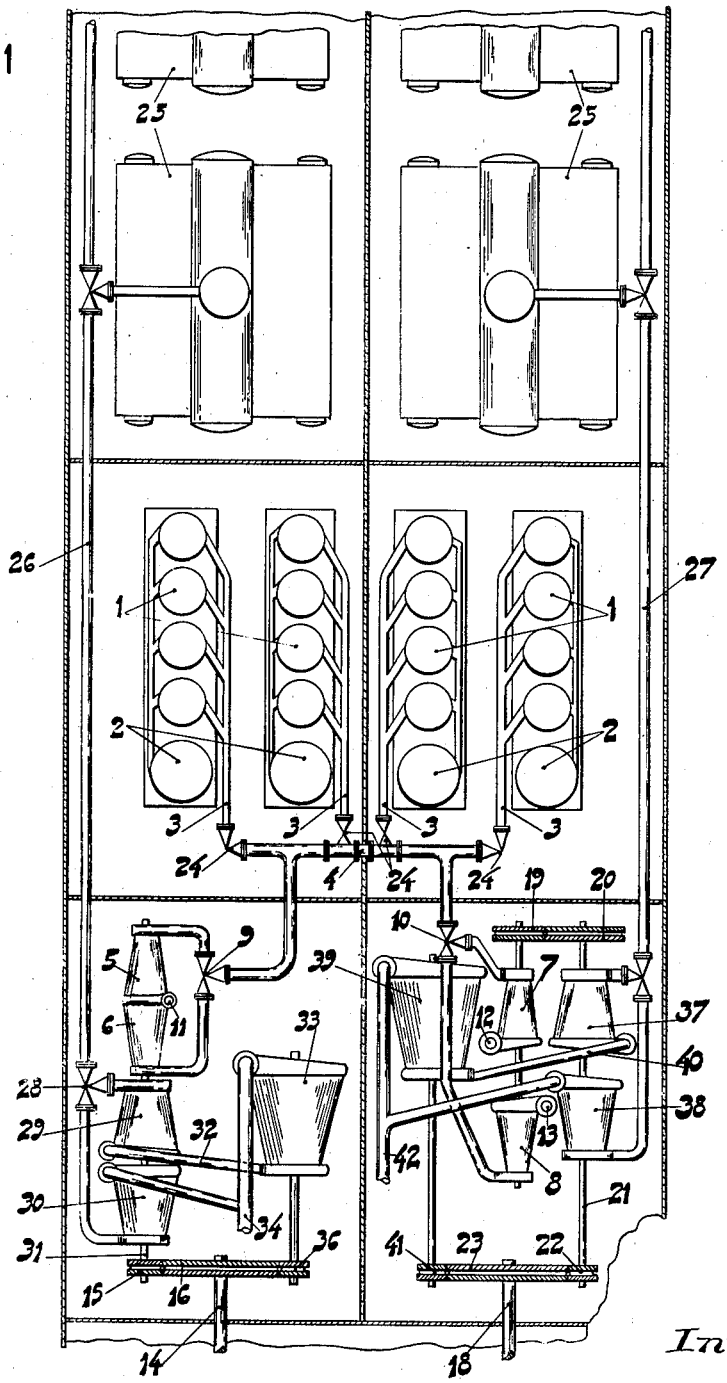

June 22, 1943.  J. E. JOHANSSON  2,322,522
VESSEL POWER PLANT
Filed March 5, 1941  2 Sheets-Sheet 1

Inventor:
Johan E. Johansson,
By Cushman Darby Cushman
Attorneys.

June 22, 1943.　　　J. E. JOHANSSON　　　2,322,522
VESSEL POWER PLANT
Filed March 5, 1941　　　2 Sheets-Sheet 2

Inventor:
Johan E. Johansson,
By Cushman Darby Cushman
Attorneys.

Patented June 22, 1943

2,322,522

UNITED STATES PATENT OFFICE 2,322,522

VESSEL POWER PLANT

Johan Erik Johansson, Goteborg, Sweden, assignor to Aktiebolaget Götaverken, Goteborg, Sweden, a corporation of Sweden Application March 5, 1941, Serial No. 381,900
In Sweden March 30, 1940

9 Claims. (Cl. 115—34)

This invention relates to vessel power plants comprising a normal load plant and a top load plant. Such power plants are preferably employed in vessels operated at highly varying load such as war vessels, ice breakers or the like. In such vessels the maximum output of the power plant is seldom utilized and the efficiency of the top load plant is therefore less important, whereas the normal load plant, which is constructed for comparatively low output and utilized for driving the vessel at normal speed, must be constructed so as to give greatest possible fuel economy in order to attain greatest possible radius of action of the vessel.

Hitherto, power plants of this type have consisted of combined steam turbine and Diesel engine plants comprising two steam turbine plants connected each per se to a side screw and a Diesel engine plant connected to a screw disposed centrally in the vessel. The Diesel engine plant usually consisted of high speed Diesel engines connected to the screw shaft by means of hydraulic couplings and toothed gearings. However, such plants become rather complicated on the one hand because the central screw must be provided with adjustable blades in order to permit the utilization of the Diesel engine plant at top speed, and on the other hand because the side screws must be arranged so as to be held in operation by means of electric motors at normal speed of the vessel in order thereby to reduce the losses otherwise caused by the screws due to their braking action on the speed of the vessel. In spite of these extensive precautions the fuel economy attained has not been quite satisfactory.

One object of the invention is to attain an essential improvement of the fuel economy of vessel power plants of the type indicated hereinabove. A further object of the invention is to provide a more simple construction of such a power plant. A still further object is to attain a saving in weight as compared with prior power plants of the type indicated hereinabove. With these and other purposes in mind I provide a normal load plant for pressure medium production comprising a reciprocating internal combustion engine and an air compressor driven thereby, the compressed air of which together with partly expanded exhaust gases from said internal combustion engine form said pressure medium, a turbine operated on said pressure medium, a propelling screw operatively connected with said turbine, a top load plant for pressure medium production comprising a high output pressure medium generator, and a turbine operated on the pressure medium produced by said generator and operatively connected with said propelling screw. The expression high output pressure medium generator is used in this specification and the claims to indicate pressure medium generators which on operation produce a large quantity of pressure medium per each pound of the generator such as steam generators, generators comprising combustion chambers of known types or combustion turbines and the like.

By carrying out the normal load plant as reciprocating internal combustion engines, the output of which is utilized to produce pressure gas or pressure air, respectively, and by transmitting said output to a turbine by causing the pressure medium produced to expand in said turbine, and by supplying the pressure medium produced by the high output top load plant to another turbine, which turbines are directly or indirectly connected to a single screw shaft, the provision of a separate screw for driving the vessel at normal speed is eliminated and it is made possible to connect the first mentioned turbine to the same screw shaft as the turbines used for forced operation of the vessel. This arrangement may also with very little loss of output be employed at highly varying turbine speeds, if the normal load turbine is carried out according to the reaction principle and provided with blades having rounded off inlet edges and if during the operation of the vessel at normal speed the rotors of the turbines which are inoperative in this case are rotated in vacuum. By using the new power plant it is also possible at any speeds lower than normal to transmit the output of the reciprocating internal combustion engines to the turbine while maintaining good fuel economy if only the pressure of the utilized pressure medium is reduced.

Figure 2:
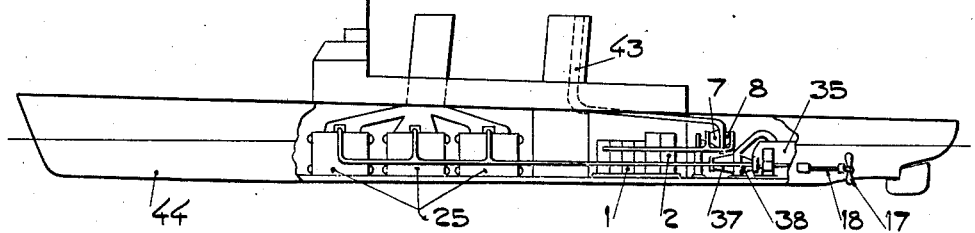
Figure 3:
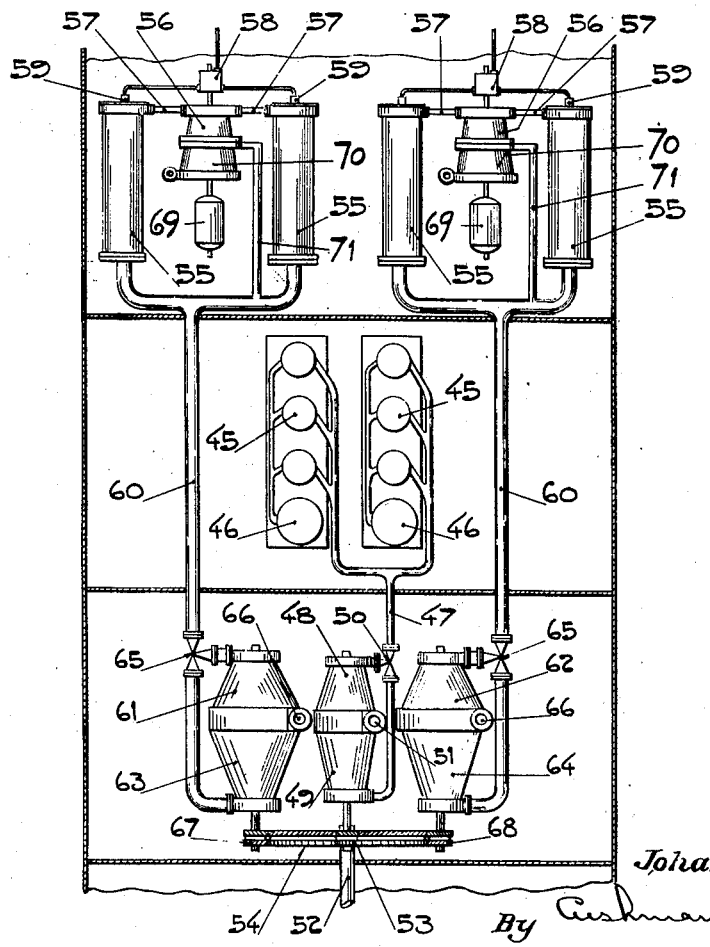

Various embodiments of the invention are illustrated in the accompanying drawings by way of example. Fig. 1 is a diagrammatic plan view of the power plant of a twin screw vessel according to the invention. Fig. 2 is a side view of a twin screw vessel partly in section showing the port power plant. Fig. 3 is a plan view of a power plant according to a further embodiment of the invention.

In Figs. 1 and 2, 1 designates four-cylinder internal combustion engines the output of which is utilized for driving air compressors 2 connected thereto and forming together with said internal combustion engines the normal load pressure gas generators. The compressed air produced by the compressors and the partly expanded combustion gases of the internal combustion engines is supplied or delivered through conduits 3 to a conduit 4 common for the four pressure gas generators. In the embodiment illustrated in Fig. 1 the pressure gas produced by the internal combustion engines 1 and the compressors 2 is supplied to ahead or astern gas turbines 5, 7 or 6, 8, respectively, according to the position of main valves 9 and 10, respectively. The exhaust gases of the gas turbines escape through conduits 11, 12, 13 to the funnel 43 of the vessel. The turbines 5, 6 are connected with a screw shaft 14 by means of a pinion 15 provided on the turbine shaft and meshing with a large pinion 16 secured on the screw shaft 14. The starboard turbines 7, 8 are connected with the starboard screw shaft 18, which carries a screw 17, through a pinion 19 provided on the turbine shaft and meshing with a toothed gear 20 provided on a secondary shaft 21 which carries a pinion 22 meshing with a toothed gear 23 secured on the screw shaft 18. The internal combustion engines 1, the compressors 2 and the gas turbines 5, 6, 7 and 8 form the normal load propulsion plant of the vessel which is intended to be operated at cruising speeds of the vessel as well as when the vessel is driven at top speed. One or more of the pressure gas generators 1, 2 may be disconnected by closing one or more of the valves 24.

For operation of the vessel at full speed a steam power plant is provided which consists of high output steam generators 25 supplying steam to a port conduit 26 and a starboard conduit 27. The conduit 26 conducts the steam over a main valve 28 to either of an ahead high pressure steam turbine 29 or an astern steam turbine 30 provided on the same shaft 31 as the gas turbines 5, 6. The outlet of the high pressure turbine 29 is connected through a conduit 32 to a low pressure steam turbine 33 which through a conduit 34 is connected to a condenser 35. The low pressure turbine 33 is connected to the screw shaft 14 by means of a pinion 36 meshing with the toothed gear 16. The starboard steam turbine plant comprises a high pressure turbine 37 and a turbine 38 which are provided on the shaft 21 and connected to the screw shaft 18 by means of the pinion 22 meshing with the toothed gear 23. The low pressure turbine 39 which is supplied with exhaust steam from the ahead high pressure turbine 37 through a conduit 40 is connected with the screw shaft 18 by means of a pinion 41 meshing with the toothed gear 23. The conduit 42 is connected with a condenser 35 and takes care of the exhaust steam of the turbines 38 or 39. It is obvious from the above statements that the only difference between the starboard and port power plants illustrated in Fig. 1 consists in different gearing of the turbines to the screw shafts, the gas turbines 5, 6 of the port plant being directly connected with the high pressure turbine 29 and the turbine 30 whereas the gas turbines 7, 8 of the starboard plant are connected to the shaft 21 of the turbines 37, 38 by means of the pinion 19 and the toothed gear 20 secured on said shaft. Naturally, the starboard and port plants may be carried out in the same way, i. e., a vessel may be provided with two screws each per se operated by a plant similar to the starboard plant or the port plant illustrated in Fig. 1. The vessel 44 illustrated in Fig. 2 is provided with two plants similar to the starboard plant illustrated in Fig. 1 and the parts of the power plant visible in Fig. 2 are therefore indicated with the same numerals as in Fig. 1.

When the vessel is driven at normal or cruising speed and the steam supply to the steam turbines is shut off the arrangement is such as to cause the low pressure prevailing in the condenser to be maintained by the ordinary pumping device provided for this purpose thus causing the rotors of the steam turbines permanently connected to the screw shaft to follow the rotation in a high vacuum. Thereby the idling losses of the steam turbines will be very low. Since, furthermore, the power consumption required for driving the condenser pump is rather low, the fuel consumption at normal speed has been calculated to amount only to about 195 g. per shaft horsepower an hour. A comparison of the fuel consumption of a vessel driven exclusively by steam and said value shows that at normal speed of the vessel only about one half of the fuel quantity required for such a steam plant is consumed. The advantage gained by the application of the invention and consisting in an increase in the radius of action of a vessel of the type in question to about the double is quite obvious. As a further advantage it may be mentioned that the total weight of the normal speed plant is low. In one case it has been calculated to be only 12 kg. per shaft horsepower and in another case to be 15 kg. per shaft horsepower. The maneuvering means of the gas turbines may preferably be so combined with those of the steam turbines that on operation ahead as well as astern the gas turbines are always started first and thereafter the steam turbines. It is obvious, furthermore, that power plants such as the port plant or the starboard plant illustrated in Fig. 1 may also be used in single screw vessels or in vessels having more than two screws, a normal load reciprocating pressure gas generator and a top load high output pressure medium generator and turbines operated on the pressure medium produced by said generators being always arranged to drive a common screw shaft. At lower than normal speed the gas pressure may be reduced.

In the embodiment of the invention illustrated in Fig. 3 the normal load plant corresponds essentially to the normal load plants already described in connection with Figs. 1 and 2 and comprises two three-cylinder reciprocating internal combustion engines 45 and air compressors 46 driven thereby, the pressure gas produced by said internal combustion engines and said air compressors being supplied through a conduit 47 to an ahead or astern gas turbine 48 or 49, respectively, according to the position of a main valve 50. After having expanded to about atmospheric pressure in one of said gas turbines the gas escapes through the outlet 51 and the funnel of the vessel to the atmosphere. The output of the gas turbines is transmitted to a screw shaft 52 by means of a pinion 53 meshing with a toothed gear 54 secured on the screw shaft.

The high output top load plant illustrated in Fig. 3 consists of combustion chambers 55 which are supplied with compressed air produced by turbo compressors 56 through conduits 57. Electric motors 69 and gas turbines 70 drive the turbo compressors during the starting period and on normal operation, respectively. Fuel is supplied to the combustion chambers 55 by fuel pumps 58 and fuel injecting devices 59 and the pressure gas produced by the combustion chambers 55 is conveyed through conduits 60 to ahead or astern gas turbines 61, 62 or 63, 64, respectively, according to the position taken by main valves 65, and to the turbines 70 through conduits 71. The gas which has expanded in the turbines, escapes through the outlets 66 to a funnel. The turbines 61, 63 and 62, 64 are connected with the screw shaft 52 by means of pinions 67 and 68, respectively, meshing with the toothed gear 54.

The plants above described and illustrated in the drawings should only be considered as illustrative examples and the invention may be modified in its details in several different ways within the scope of the following claims. The pressure gas produced by the normal load pressure gas producers may comprise a mixture of air and combustion gases formed either outside of or in the internal combustion engines, or compressed air only may be produced by the compressors driven by the internal combustion engines, and said compressors may be reciprocating or rotary compressors. The normal load plant may comprise any number of reciprocating internal combustion engines, air compressors and turbines. The pressure medium produced by the high output top load pressure medium generators may comprise any number of pressure medium generators and may be adapted to feed any number of one or multiple stage turbines connected directly or by means of suitable gearings or other transmissions to the screw shaft.

What I claim is:

1. In a vessel power plant, a normal load plant for pressure medium production comprising a reciprocating internal combustion engine and an air compressor driven thereby, the compressed air of which together with partly expanded exhaust gases from said internal combustion engine form said pressure medium, a turbine operated on said pressure medium, a propelling screw operatively connected with said turbine, a top load plant for pressure medium production comprising a high output pressure medium generator, and a high-pressure turbine operated on the pressure medium produced by said generator and operatively connected with said propelling screw.

2. In a vessel power plant, a normal load plant for pressure medium production comprising a reciprocating internal combustion engine and an air compressor driven thereby, the compressed air of which together with partly expanded exhaust gases from said internal combustion engine form said pressure medium, a turbine operated on said pressure medium, a propelling screw operatively connected with said turbine, a top load plant for pressure steam production comprising a high output pressure steam generator, a steam turbine operated on the steam produced by said steam generator and operatively connected with said propelling screw, and means for controlling the operative connection of the turbines to said propeller screw.

3. In a vessel power plant, a normal load plant for pressure medium production comprising a reciprocating internal combustion engine and an air compressor driven thereby, the compressed air of which together with partly expanded exhaust gases from said internal combustion engine form said pressure medium, a turbine operated on said pressure medium, a propelling screw operatively connected with said turbine, a top load plant for pressure steam production comprising a high output pressure steam generator, a high pressure steam turbine operated on the steam produced by said generator and connected with said propelling screw by means of toothed gearings, and a low pressure steam turbine operated on the exhaust steam of said high pressure steam turbine and connected with said propelling screw by means of other toothed gearings.

4. In a vessel power plant, a normal load plant for pressure medium production comprising a reciprocating internal combustion engine and an air compressor driven thereby, the compressed air of which together with partly expanded exhaust gases from said internal combustion engine form said pressure medium, a gas turbine operated on said pressure medium, a top load plant for pressure steam production comprising a high output pressure steam generator, a high pressure steam turbine operated on the steam produced by said generator and arranged co-axially with said gas turbine, a pinion driven by said gas turbine and said high pressure steam turbine, a propelling screw, a screw shaft carrying said screw, a toothed gear secured on said screw shaft and meshing with said pinion, a low pressure steam turbine operated on the exhaust steam of said high pressure steam turbine, and a pinion driven by said low pressure steam turbine and meshing with said toothed gear.

5. In a vessel power plant a normal load plant for pressure medium production comprising a reciprocating internal combustion engine and an air compressor driven thereby, the compressed air of which together with partly expanded exhaust gases from said internal combustion engine form said pressure medium, a gas turbine operated on said pressure medium, a top load plant for pressure steam production comprising a high output pressure steam generator, a high pressure steam turbine operated on the steam produced by said steam generator, a pinion driven by said gas turbine, a toothed gear secured to said high pressure steam turbine and meshing with said pinion, a propelling screw, a screw shaft carrying said screw, a toothed gear secured on said screw shaft, a pinion driven by said high pressure steam turbine and meshing with said toothed gear, a low pressure steam turbine operated on exhaust steam from the high pressure steam turbine, and a pinion driven by said low pressure steam turbine and meshing with said toothed gear on the screw shaft.

6. In a vessel power plant, a normal load plant for pressure medium production comprising reciprocating internal combustion engines and air compressors driven thereby, the compressed air of which together with partly expanded exhaust gases from said internal combustion engines form said pressure medium, a common delivery conduit for said pressure medium, gas turbines operated on said pressure medium, a propelling screw, a screw shaft carrying said screw, a toothed gear secured on said screw shaft, a pinion meshing with said toothed gear and driven by said gas turbines, a top load plant for pressure medium production comprising high output pressure medium generators, turbines operated on the pressure medium produced by said high output pressure medium generators, pinions driven by said turbines and meshing with said toothed gear on the screw shaft, and means for controlling the operative connection of the turbines to said screw shaft.

7. In a vessel power plant, a normal load plant for pressure medium production comprising a reciprocating internal combustion engine and an air compressor driven thereby, the compressed air of which together with partly expanded exhaust gases from said internal combustion engine form said pressure medium, a gas turbine operated on said pressure medium, a propelling screw operatively connected with said turbine, a top load plant for pressure medium production comprising a high output combustion chamber, an air compressor connected with said chamber and supplying compressed air to said chamber, a fuel injection device in said chamber adapted to supply fuel to said chamber, a gas turbine operated on the pressure medium delivered from said combustion chamber and operatively connected with said propelling screw.

8. In a vessel power plant, a normal load plant for pressure medium production comprising a reciprocating internal combustion engine and an air compressor driven thereby, the compressed air of which together with partly expanded exhaust gases from said internal combustion engine form said pressure medium, a gas turbine operated on said pressure medium, a propelling screw, a screw shaft carrying said screw, a toothed gear secured on said screw shaft, a pinion driven by said gas turbine and meshing with said toothed gear, a top load plant for pressure medium production comprising a high output pressure medium generator, a turbine operated on the pressure medium produced by said high output pressure medium generator, a pinion driven by said turbine and meshing with the toothed gear on the screw shaft, and means controlling the operative connection of the turbines to said screw shaft.

9. In a vessel power plant, a normal load plant for pressure medium production comprising a reciprocating internal combustion engine and an air compressor driven thereby, the compressed air of which together with partly expanded exhaust gases from said internal combustion engine form said pressure medium, a reaction turbine with blades having rounded inlet edges operated on said pressure medium, a propelling screw operatively connected with said turbine, a top load plant for pressure medium production comprising a high output pressure medium generator, and a turbine operated on the pressure medium produced by said generator and operatively connected with said propelling screw.

JOHAN ERIK JOHANSSON.